Dec. 18, 1923. 1,477,651

C. C. KOELN

BORING TOOL

Filed Jan. 17, 1921

Inventor:
CHRISTIAN C. KOELN,
John H. Bruninga
His Attorney

Patented Dec. 18, 1923.

1,477,651

UNITED STATES PATENT OFFICE.

CHRISTIAN C. KOELN, OF ST. LOUIS, MISSOURI.

BORING TOOL.

Application filed January 17, 1921. Serial No. 437,814.

*To all whom it may concern:*

Be it known that I, CHRISTIAN C. KOELN, a citizen of the United States, and residing at St. Louis, Missouri, have invented the new and useful Improvement in Boring Tools, of which the following is a specification.

This invention relates to tools and more particularly to boring tools.

In some classes of tools, such as boring tools, a cutter is used which has cutting edges at its ends adapted for cooperation with the work to form therein a hole of a given diameter as determined by the distance between the cutting edges. Accordingly the cutting edges are accurately ground in order to form the hole with the required accuracy, and in most classes of work, even slight variations cannot be tolerated. Of course, the cutting edges of even high speed steel will become dull, but where sharpening is attempted, in such cases the grinding operation will reduce the distance between the cutting edges so that a hole of the desired diameter cannot be bored.

In order to permit grinding of the cutting edges while still maintaining the proper distance therebetween, mechanical adjustment is resorted to; this, however, presents mechanical difficulties and requires a divided cutter subject to errors and not as satisfactory as a one-piece cutter in which the cutting edges are connected by a body of metal.

One of the objects of this invention, therefore, is to provide a cutter in which the cutting edges are on the same piece of metal and, therefore, connected but whereby the cutting edges may be expanded.

Further objects will appear from the detail description taken in connection with the accompanying drawing, in which.

Figure 1:
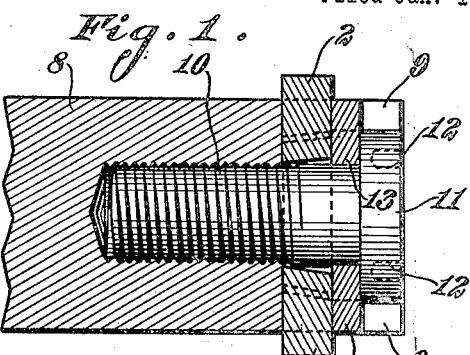
Figure 1 is a longitudinal vertical section showing a tool embodying this invention.
Figure 2:
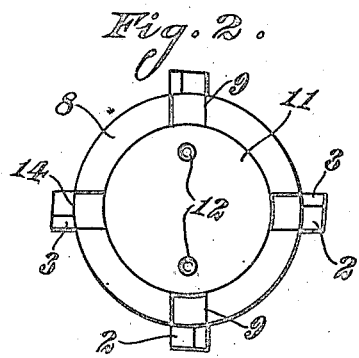
Figure 2 is an end elevation.
Figure 3:
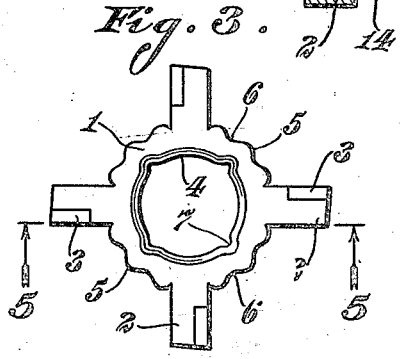
Figure 3 is a face view showing a cutter embodying this invention.
Figure 4:
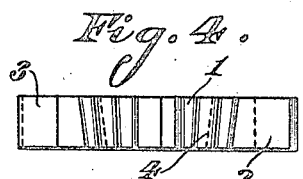
Figure 4 is a side elevation of Figure 3.
Figure 5:
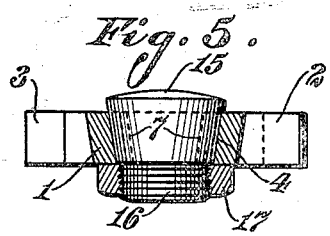
Figure 5 is a section on the line 5—5, Figure 3.

Referring to the accompanying drawing, and more particularly to Figures 1 to 5 inclusive, the cutter comprises a body 1 of any suitable malleable material, such as cold rolled steel, and this body has radially projecting therefrom cutter elements 2 each of which may be provided with a facing 3 of hardened steel, such as one of the high speed steels now employed, this facing being suitably secured to the element as by welding or in any other suitable manner.

The body is provided with a tapering recess 4 which may be slotted in form while the outside of the body between the elements may be undulated or tortuous by having hills and valleys 5 and 6 respectively and the inside of the recess may be correspondingly undulated as shown at 7.

The cutter may be clamped in any suitable shank 8 of a boring tool, the radial elements being located in recesses 9 therein, while this cutter may be clamped in position by a screw 10 having a head 11 provided with perforations 12 adapted for cooperation with a suitable rest and interposed between the head 11 and the cutter may be a gib 13 provided with arms 14 corresponding to the cutter elements 2 but shorter. The cutters may, therefore, be securely clamped in the shank so as to be operable for use as a boring tool.

After the cutting edges have become dull or worn, the cutter is removed and expanded or spread by a suitable device, such as a tapered spreader 15 and by tapping the top of this spreader while the cutter is placed on an anvil, tension is applied to the body as the inclined sides of the tapered recess act as abutments for the spreader. The resultant effect will, therefore, be an enlargement of the recess with the resultant expansion of the body and expansion of the cutting edges radially. The undulations in the body permit this spreading with greater ease as the effect will be the partial straightening out of these undulations in order to effect the expansion. In order to secure accurate action in this respect, the spreader is provided with a thread 16 adapted to receive a nut 17 so that the spreading may be accurately accomplished; as an example in practice, the spreader will be tapped with a hammer so as to cause its spreading action and as it sinks into the recess, the nut will be taken up so as to always locate this spreader in firm contact; in this way, the cutting edges can be very accurately expanded to secure the proper increase in diameter for the purpose of compensating for the wearing of the cutting edges and finally the cutting edges may be ground down to the proper size. The cutters can then again be inserted into the tool which is then ready for further use.

Figure 6:
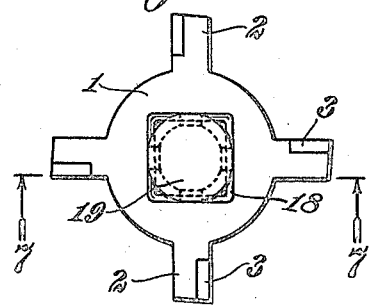
Figure 6 is a face view showing another embodiment of this invention.
Figure 7:
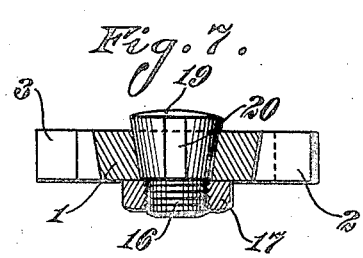
Figure 7 is a section on the line 7—7, Figure 6.

In the embodiments shown in Figures 6 and 7, the malleable body 1 may be externally plain and is provided with a tapered recess 18 which, however, is in this case square or any other angular form. Adapted to cooperate with the walls of this tapered recess is a spreader 19 which has flat portions 20 adapted to cooperate with the flat walls at diametrically opposite points as shown and this spreader may also be threaded and provided with a nut as shown in the other embodiment. It will be seen from what has been previously described with reference to the previous embodiment that upon tapping of the spreader, the cutter body is extended in order to expand the cutting edges.

Figure 8:
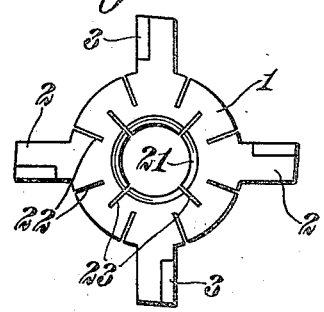
Figure 8 is a face view showing still another embodiment of this invention.

In the embodiment shown in Figure 8, the malleable body 1 is provided with a circular tapered recess 21 which may, however, be provided both externally and internally with radial saw-cuts 22 and 23 and these saw-cuts alternate and extend past one another so as to provide a somewhat flexible body. This body may be expanded by the insertion of a tapered spreader similar to the spreader 19 except that the flat faces 20 may, in this case, be omitted. It will be seen from what has been previously described with reference to the preceding embodiment that the application of the spreader to this cutter will cause expansion of the cutting edges.

It will, therefore, be seen that the invention accomplishes its objects. A cutter is provided which is capable of extension so as to expand the cutting edges, at the same time always maintaining the permanent connection between these cutting edges. It is understood, of course, that the application of the spreader is continued until the metal of the malleable body has been straightened beyond its elastic limit so as to cause a set of the body. It will furthermore be understood that the actual spreading usually applied to such a cutter is very small since it must be accomplished when the cutting edges have worn down only a few thousandths of an inch in order to compensate for the wear. However, not only may the cutting edges be extended accurately for small fractions of an inch, but they may also be extended considerably so as to adapt a given cutter to a number of different sizes within small limitations. Furthermore the cutting edges may be repeatedly expanded in order to permit repeated grinding with the result that the life of the cutter is enormously increased. It will also be seen that since the spreading forces are so applied as to be radial, all of the cutting edges will be radially expanded in unison and with uniformity. Furthermore a cutter may be expanded which has more than two cutting edges since the expansion is in divergent directions and along the respective cutter elements.

It is obvious that various changes may be made in the details of construction without departing from the spirit of this invention; it is, therefore, to be understod that this invention is not to be limited to the specific details shown and described.

Having thus described the invention what is claimed is:

1. In a boring tool, a cutter having cutting edges and a recessed malleable body joining said edges radially therewithin and providing a firm backing therefor, said body being formed and adapted for tensional extension in order to effect and maintain an inherent set expansion of said edges.

2. In a tool, a cutter having cutting edges, a tortuous malleable body joining said edges, and means adapted to effect rectification of said body in order to cause a set expansion of said edges.

3. In a boring tool, a cutter having cutting edges and a recessed malleable body joining said edges radially therewithin and providing a firm backing therefor, said body being formed for extension and adapted for the application of spreading means so as to extend said body by tension in order to cause a set expansion of said edges, such expansion being maintained inherently by said body and independent of the spreading means.

4. In a boring tool, a cutter having cutting edges and a malleable body joining said edges radially therewithin and providing a firm backing therefor, said body being formed for extension and having abutments adapted for the application of spreading means so as to extend said body by tension in order to cause a set expansion of said edges, such expansion being maintained inherently by said body and independent of the spreading means.

5. In a boring tool, a cutter having cutting edges and a malleable body joining said edges radially therewithin and providing a firm backing therefor, said body having abutments adapted for thrusts towards said edges in order to effect and maintain an inherent set expansion of said edges.

6. In a boring tool, a cutter having cutting edges and a malleable body joining said edges radially therewithin and providing a firm backing therefor, said body having an interior recess providing abutments adapted for thrusts towards said edges in order to effect and maintain an inherent set expansion of said edges.

7. In a boring tool, a cutter having cutting edges and a malleable body joining said edges radially therewithin and providing a firm backing therefor, said body having an interior recess providing an extensible surrounding wall in order to permit expansion of said edges and inherently maintain a set expansion.

8. In a boring tool, a cutter having a malleable body and cutter elements radiating in intersecting directions from said body and provided with cutting edges, said body providing a firm backing for said cutting edges and being adapted for extension in divergent directions in order to cause expansion of said edges and inherently maintain a set expansion.

9. In a boring tool, a cutter having a malleable body and cutter elements radiating from said body in intersecting directions and provided with cutting edges, said body providing a firm backing for said cutting edges and being adapted for extension in order to cause expansion of said edges and inherently maintain a set expansion.

10. In a boring tool, a cutter having a malleable body and cutter elements radiating from said body in intersecting directions and provided with cutting edges, said body providing a firm backing for said cutting edges and being adapted for extension along said respective elements in order to cause expansion of said edges and inherently maintain a set expansion.

11. In a tool, a cutter having cutting edges and a malleable body joining said edges, said body having a recess adapted to receive spreading means and having undulations surrounding said recess, in order to cause expansion of said edges.

12. In a tool, a cutter having a malleable body and cutter elements radiating in intersecting directions from said body and provided with cutting edges, said body having a recess adapted to receive spreading means and having undulations surrounding said recess, in order to cause expansion of said edges.

13. In a boring tool, a cutter having cutting edges and a malleable body joining said edges radially therewithin and providing a firm backing therefor, said body being formed for uniform extension in divergent directions in order to cause expansion of said edges and inherently maintain a set expansion.

14. In a boring tool, a cutter having a malleable body, cutter elements radiating in intersecting directions from said body, said body providing a firm backing for said elements, and means adapted to effect extension of said body in order to cause and maintain an inherent set expansion of said edges.

15. In a boring tool, a cutter having a malleable body and cutter elements radiating in intersecting directions from said body providing a firm backing for said elements and said body having thrust-receiving abutments, adapted to effect extension of said body in order to cause and maintain an inherent set expansion of said edges.

16. In a boring tool, a cutter having a malleable body and cutter elements radiating in intersecting directions from said body providing a firm backing for said elements and said body having an interior recess providing thrust-receiving abutments, adapted to effect extension of said body in order to cause and maintain an inherent set expansion of said edges.

17. In a boring tool, a cutter having a malleable body, and cutting elements radiating in intersecting directions from said body providing a firm backing for said elements and said body being formed for circumferential extension in order to cause expansion of said edges and inherently maintain a set expansion.

18. In a boring tool, a cutter having a malleable body, and cutting elements radiating in intersecting directions from said body providing a firm backing for said elements and said body having abutments and being formed for circumferential extension in order to cause expansion of said edges and inherently maintain a set expansion, and means engaging said abutments for extending said body.

19. In a boring tool, a cutter having cutting edges and a recessed malleable body joining said edges radially therewithin, said body being formed and adapted for extension in order to effect and maintain a set expansion of said edges.

20. In a boring tool, a cutter having a recessed malleable body and a series of cutter elements radiating therefrom and joined thereby radially therewithin, said body being formed and adapted for extension in order to effect and maintain a set expansion of said edges.

21. In a boring tool, a cutter having a recessed malleable body and a series of cutter elements radiating therefrom, said body being formed and adapted for extension so as to effect a set expansion bodily of said cutter elements.

22. In a boring tool, a cutter having a series of cutting edges and a recessed malleable body joining said edges, said body being formed and adapted for expansion so as to effect a set expansion of said edges uniformly therealong.

In testimony whereof I affix my signature this 16th day of December, 1920.

CHRISTIAN C. KOELN.